UNITED STATES PATENT OFFICE.

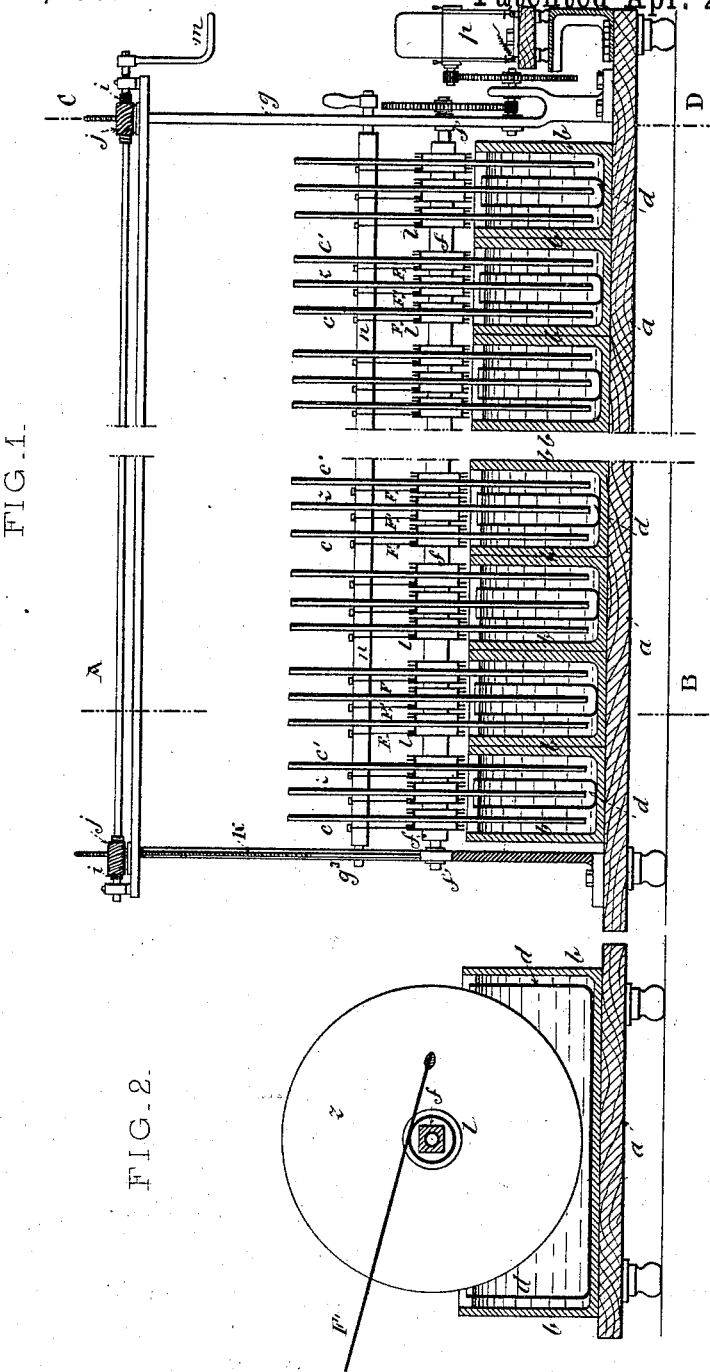

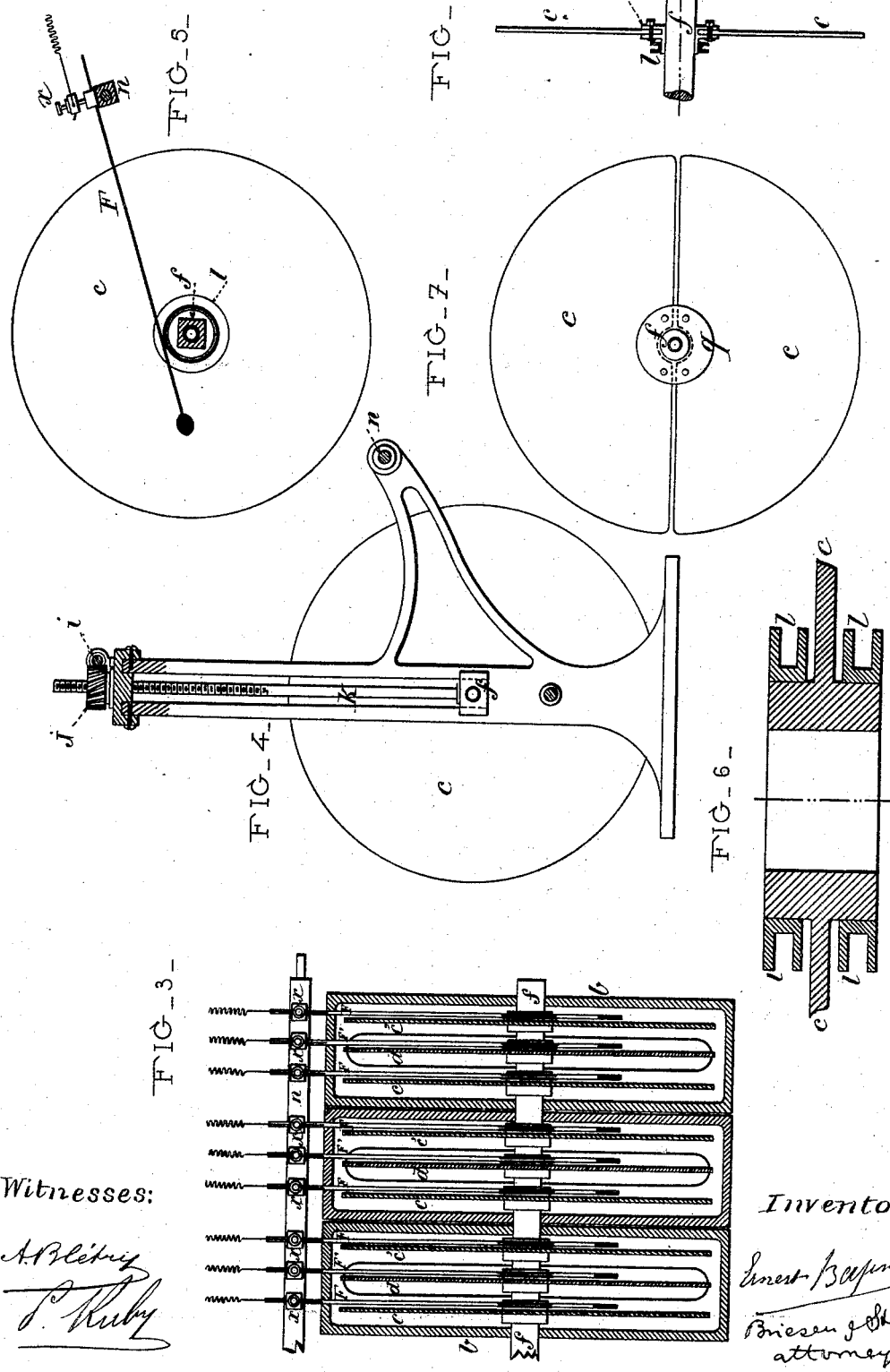

ERNEST BAZIN, OF PARIS, FRANCE.

ELECTRIC BATTERY.

SPECIFICATION forming part of Letters Patent No. 316,436, dated April 28, 1885.

Application filed August 14, 1884. (No model.) Patented in France July 21, 1884, No. 163,413, and in Belgium July 23, 1884, No. 65,846.

*To all whom it may concern:*

Be it known that I, ERNEST BAZIN, a citizen of France, residing at Paris, in the French Republic, have invented a new and useful Electric Battery, (for which I obtained Letters Patent in France, for fifteen years, dated July 21, 1884, No. 163,413. and in Belgium, dated July 23, 1884, No. 65,846, for fifteen years,) of which the following is a specification.

The feature of novelty in the invention consists in mechanically moving the zinc and carbon elements of electric batteries, and, in particular, in imparting to them a rotary motion. The elements in this case are in the form of disks, the object of such arrangement being to destroy or prevent the formation and adhesion to these elements of hydrogen globules, which in attaching themselves to them produce polarization of the battery. The zinc and carbon elements being rotated by special appliances the exciting-liquid can be stirred or skimmed and the elements can be wiped, if necessary, by applying scrapers or sponge brushes to them or in covering them with a special tissue for removing the hydrogen globules. The disks can be smooth, striated, with holes in them, or constructed in the most suitable manner for their proper action. Their rising from the exciting-bath removes froth from them, and their return to it introduces a little oxygen. The zincs and carbons can be replaced by any other substance having the same active and conducting properties.

The invention is equally applicable to bichromate of potash or other liquid batteries, and for special liquids without porous vases or cells, which simplifies the system and facilitates its maintenance.

The method of mounting the zincs and carbons on the axis of rotation is clearly illustrated by the accompanying drawings, their form and dimensions may vary *ad infinitum*, which it is unnecessary here to describe, the essential feature being the principle as herein expressed. I have named the invention "Bazin's depolarizer," and it can be applied in the production of light, force, for the telephone, in telegraphy, galvano-plastics, and generally in the production of electric currents for various applications.

Description of the apparatus: In Sheet 1 of the drawings, Figure 1 is a sectional elevation of a battery supplied with my depolarizing appliances. Fig. 2 is a vertical section following the line A B. Fig. 3, Sheet 2, is a plan of a certain number of elements of a battery supplied with my mechanical depolarizing appliances. Fig. 4 is a vertical section by the line C D of Fig. 1. Fig. 5 shows in detail one of the electric contacts of a zinc or carbon element. Fig. 6 shows a disk of the contacts full size. Figs. 7 and 8 show in front and transverse section a method of replacing the zinc and carbon elements.

On a table, $a$, are grouped side by side a certain number of elements, each one of which comprises a case or vase of glass, $b$, a porous cell, $d$, two carbons, $c\ c'$, plunging in the exciting-liquid, and the zinc placed in the porous cell $d$, which occupies the center of the case $b$. The zincs $z$ and the carbons $c\ c'$ are both the same shape—that of a circular disk—as shown by Figs. 2, 4, 5, 6, 7, and 8. They are furnished in the center with a kind of hub of zinc or carbon intended to keep them in position on an axis, $f$, common to all, of ebonite or other suitable insulating substance, the ends of which axis turn in cushions $f'\ f'$, adjusted on the frame $g\ g'$, bolted to the table $a$. The cushions $f'\ f'$ are movable vertically, and can be raised or lowered simultaneously by means of a crank, $m$, which motion is transformed by two endless screws, $i\ i$, and helical gearing $j\ j$, into rectilinear displacements by aid of the two shafts $k\ k$, which are solid with the cushions $f'f'$, and are wormed or threaded at the summit, so as to gear with the wheels $j\ j$. This arrangement admits of lifting all the zinc and carbon elements at a time from the liquid when the battery is no longer in use.

The hubs of the disks bear on one or both sides (*vide* Fig. 6) grooves $l\ l$, intended for establishing electrical contacts with wires or bands of copper F F', arranged as shown, Figs. 1, 2, 3, and 5—that is to say, resting or winding round the grooves—and bearing a counterpoise at the free end, and fixing at the other end to a terminal, $x$, on an insulating bar, $n$, common to all, and supported by the frame $g\ g'$. The terminals bear the conducting-wires directing the electricity in the manner required—that is to say, whether the battery is for tension or quantity.

The shaft $f$ is set in motion either automatically by aid of springs or weights, as shown by Fig. 1. In this case two elements supply electricity to the motor $p$, which is in connection with the shaft $f$, by a combination of gear-work and toothed pinions, in accordance with the speed of rotation to be imparted to the zinc and carbon disks.

Figs. 7 and 8 show an arrangement for facilitating, when required, the mounting and replacing or renewing of the zinc and carbon elements. These consist of two half-disks united by muffles $q$.

Action of the depolarizer: Polarization causing globules of hydrogen to attach themselves to the zinc and carbon elements, it will be readily conceived that a rotary motion imparted to these elements on one hand produces a friction in the liquid sufficient to destroy these globules, and, on the other hand, should the gaseous globules be drawn along undisturbed outside the liquid, by judicious precautions these globules are easily made to disappear from the disks. The parts of the disks which plunge into the bath take with them into the liquid an appreciable quantity of oxygen, which, with the disposable hydrogen, reforms water, increasing the duration of the battery by that amount.

My improved system of depolarization insures a uniform production of electricity until a natural exhaustion of the exciting properties of the liquid occurs, which is an industrial result vainly searched for (and chemically applied or effected) up to the present.

I claim as my invention—

1. In an electric battery, the combination of the vase $b$ and inner porous cell, $d$, with the carbon disks $c\ c'$, zinc disk $z$, rotary shaft $f$, copper bands F F', insulating bar $n$, and terminals $x$, the bands F F' resting on the hubs of the said disks, and the said disks, respectively, extending into the vase and cell, as set forth.

2. The combination of the shaft $f$, carrying the disks $c\ c'$ and $z$, with the vase $b$, porous cell $d$, copper bands F F', frame $g$, bearings $f'$, shafts $k\ k$, worm-wheels $j$, screws $i\ i$, and crank $m$, substantially as herein shown and described.

ERNEST BAZIN.

Witnesses:
A. BLÉTRY,
ROBT. M. HOOPER.